(12) United States Patent
Doecker et al.

(10) Patent No.: US 8,163,379 B2
(45) Date of Patent: Apr. 24, 2012

(54) SANDWICH STRUCTURE

(75) Inventors: Michael Doecker, Bremen (DE); Florian Macke, Lilienthal (DE); Klaus Schoote, Bremen (DE); Jens Wieting, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 781 days.

(21) Appl. No.: 12/316,471

(22) Filed: Dec. 12, 2008

(65) Prior Publication Data

US 2010/0055384 A1 Mar. 4, 2010

Related U.S. Application Data

(60) Provisional application No. 61/008,707, filed on Dec. 21, 2007.

(51) Int. Cl.
*B32B 3/26* (2006.01)
*B32B 3/12* (2006.01)
*B32B 3/14* (2006.01)
*D04H 11/00* (2006.01)

(52) U.S. Cl. ......... 428/304.4; 428/56; 428/73; 428/178; 428/119

(58) Field of Classification Search ................. None
See application file for complete search history.

(56) References Cited

U.S. PATENT DOCUMENTS

| | | | | |
|---|---|---|---|---|
| 5,139,596 A | * | 8/1992 | Fell | 156/205 |
| 5,139,843 A | * | 8/1992 | Murakami et al. | 428/116 |
| 2006/0046019 A1 | * | 3/2006 | Wang et al. | 428/73 |

FOREIGN PATENT DOCUMENTS

| WO | WO 85/03032 | 7/1985 |
|---|---|---|
| WO | WO 92/18329 | 10/1992 |

OTHER PUBLICATIONS

Office action filed in corresponding DE patent application 10 2007 062 082.0-16.

* cited by examiner

*Primary Examiner* — Gordon R Baldwin
(74) *Attorney, Agent, or Firm* — Greer, Burns & Crain, Ltd.

(57) ABSTRACT

The present invention provides a sandwich structure with a core element in honeycomb form and outer layers with carbon fiber and glass fiber layers, the glass fiber layers being applied to the outer sides of the sandwich structure.

13 Claims, 1 Drawing Sheet

SANDWICH STRUCTURE

CROSS-REFERENCE TO RELATED APPLICATIONS

This application claims the benefit of U.S. Provisional Application No. 61/008,707, filed Dec. 21, 2007, the entire disclosure of which is herein incorporated by reference.

FIELD OF THE INVENTION

The present invention relates to a sandwich structure with a core element and outer layers comprising carbon fiber and glass fiber layers.

BACKGROUND OF THE INVENTION

Although it can be applied to any areas, the present invention and the problems on which it is based are explained in more detail with reference to aerospace.

In aircraft construction, composite structures of the same construction are currently being used in upper decks both for cargo aircraft and for passenger aircraft. These composite structures have a core element, with an outer layer comprising fiber layers applied on its upper side and underside. The applicant is familiar with core elements with a honeycomb structure comprising an aramid fiber, for example a Nomex® honeycomb. On both sides of the core element there may be a variable number of fiber layers. These fiber layers may differ in their resin content, the type of resin used and the type of glass fiber used. Prepreg glass fiber materials are usually used for constructing the systems.

A disadvantage of the use of glass fibers as fiber reinforcements for a core element is the high weight of the glass fiber reinforcements. However, in the aerospace sector in particular, weight is an important factor.

SUMMARY OF THE INVENTION

It is therefore one of the objects of the present invention to provide a sandwich structure of a reduced weight. A further object of the present invention is to provide a sandwich structure with increased flexural rigidity and impact strength.

Accordingly, a sandwich structure comprises an upper outer layer; a lower outer layer; and a core element formed as a honeycomb structure arranged between the outer layers; the outer layers each comprising at least one carbon fiber layer facing the core element and at least one glass fiber layer facing away from the core element, at least two carbon fiber layers being applied on each side of the honeycomb structure, and the fibers of the carbon fiber layers being laid in different directions.

The idea on which the present invention is based is that the use of carbon fiber layers instead of glass fiber layers in the interior of the sandwich structure can achieve a weight reduction with at the same time increased flexural rigidity and impact toughness or impact strength.

According to one embodiment, the honeycomb structure comprises an aramid fiber.

Aramid fibers are distinguished by very high strength, high impact toughness, high elongation at break, good vibration damping and resistance to acids and alkalis. They are additionally very resistant to heat and fire. Aramid fibers do not melt at high temperatures, but begin to carbonize from approximately 400° C.

According to one particular embodiment, the honeycomb structure is composed of an aramid fiber paper. The aramid fiber paper may, for example, be formed by means of customary papermaking processes. The honeycomb structure may be composed of a paper with meta-aramid fibers and/or a paper with a mixture of meta-aramid fibers and para-aramid fibers.

Such aramid fiber papers are commercially known, for example, as Nomex® paper. This paper may be impregnated or coated with a synthetic resin, for example an epoxy or phenolic resin, in order to further increase the stability and prevent liquid absorption by the paper. Aramid fiber paper comprising meta-aramid fibers is in this case penetrated less well by a synthetic resin than a paper comprising a mixture of meta-aramid fibers and para-aramid fibers. The meta-aramid fiber paper may therefore be provided with a coating in the form of a lacquer. If the synthetic resin penetrates the fiber paper, a lighter structure can be produced in comparison with merely coated papers with the same stability.

According to another embodiment of the present invention, the honeycomb structure has a hexagonal structure or an approximately hexagonal structure.

The use of hexagonal honeycomb structures, which are also referred to as honeycombs, allows a high mechanical strength to be achieved with at the same time low weight.

According to yet another embodiment of the present invention, at least two carbon fiber layers are contained in one or both outer layers. These layers may be directly adjacent to one another.

The carbon fibers are oriented within a layer. In this case, the fibers within a layer preferably point in one direction. If a number of different carbon fiber layers are present, the orientations of the carbon fibers in the different layers may have different directions, in particular. In a embodiment, the carbon fibers point in different directions and form an angle between the fibers of 80°-100°, for example an angle of approximately 90°, between the different layers. However, it is also possible for the carbon fibers to form different angles. Angles of between 40° and 50°, in particular approximately 45°, are also possible.

If more than two carbon fiber layers are incorporated in one or both outer layers, the carbon fibers contained in the layers may form different angles. If, for example, the first carbon fiber layer points in a direction of 0°, for example parallel to the fuselage of an aircraft, the orientation of the fibers in a further carbon fiber layer may point in a direction of 45°, in a direction of 90° and/or in a direction of 135° with respect to the fibers of the first carbon fiber layer.

If the carbon fiber layers are oriented in different directions, the forces occurring can be transmitted in a specifically directed manner. It is consequently possible to design the composite structure in such a way that the carbon fiber layers are oriented in the directions of principal force transmission.

According to another embodiment of the present invention, the carbon fibers in the carbon fiber layers are laid fabrics.

The laid fabrics may advantageously be formed from prepreg carbon fibers. The use of prepreg fibers allows the fibers to be incorporated in the layers in a directed manner and the different layers to be produced at low cost.

According to another embodiment of the present invention, the glass fibers of the glass fiber layers are laid or woven.

The glass fiber layers may be both laid and woven. Here, too, prepreg glass fibers can be advantageously used for forming the glass fiber layers. The glass fiber layers are preferably attached to the outwardly directed side of the sandwich structure, i.e. the carbon fiber layers lie between the core element and the glass fiber layer or layers. The glass fiber layers protect the inner carbon fiber layers from wear. In addition, the glass fiber layers serve as corrosion protection. On account of the high conductivity of the carbon fibers, materials that are adjacent to the carbon fibers and in conductive contact with them corrode easily. Since glass fibers can serve as an insulator, layers of glass fibers prevent corrosion. In addition, glass fibers are resistant to scuffing and therefore offer good protection against abrasion of the sandwich structure. Finally, glass fiber layers on the outer side of a sandwich structure increase the impact toughness of the sandwich structure.

It is also possible that the resin used for forming the carbon fiber layers and the glass fiber layers is identical for all the layers. If the same resin is used for all the layers, the contact between the layers can be established better.

According to another embodiment of the present invention, the sandwich structure has a total thickness of 5-30 mm, e.g. 7-15 mm, or even more specifically approximately 10 mm.

The use of the carbon fibers in the outer layers gives the sandwich structure high strength and flexural rigidity with at the same time low weight.

BRIEF DESCRIPTION OF THE DRAWINGS

The present invention is explained in more detail below using preferred exemplary embodiments and with reference to the attached figures of the drawings, in which.

DETAILED DESCRIPTION OF THE INVENTION

Figure 1:
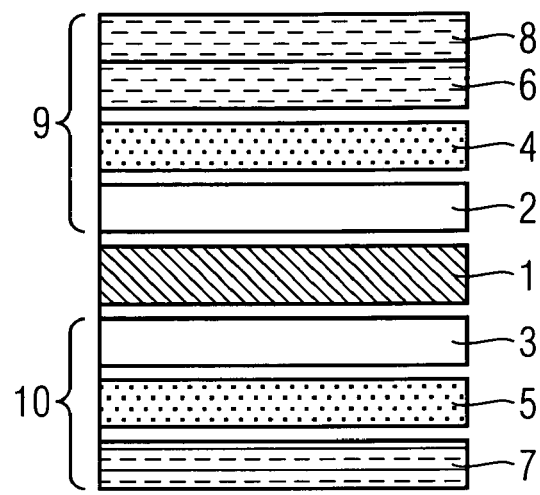
FIG. 1 shows a sandwich structure according to a first exemplary embodiment.

FIG. 1 illustrates the construction of a sandwich structure according to a first exemplary embodiment of the present invention. A honeycomb structure 1 of the Nomex®-144 type, containing a meta-aramid fiber and having a density of 1267 g/m$^2$ and a thickness of 8.8 mm, is used here as the core element.

Applied to this honeycomb structure on each side is a carbon fiber layer 2, 3 with a density of 420 g/m$^2$, using a HTS (High Tenacity Strength) carbon fiber with 12 000 (12K) filaments per thread. These carbon fiber layers are laid carbon fiber fabrics. These carbon fiber layers may be produced from prepreg materials. The tape orientation of the carbon fibers may be arranged along the loading, for example in the longitudinal direction of an aircraft, in the first layer 2, 3.

According to one embodiment, respectively applied to these carbon fiber layers 2, 3 is a further carbon fiber layer 4, 5. The fibers of the second carbon fiber layer are aligned perpendicularly in relation to the alignment of the fibers in the first carbon fiber layer. The density of this layer is 308 g/m$^2$.

Applied to the outer side of the sandwich structure is a glass fiber layer 6, 7. An S glass fiber can be used on the side of greater loading of the sandwich structure. A further glass fiber layer 8 of S glass may also be applied on the side of greater loading. The density of the S glass fiber layer is in each case 192 g m$^2$. Applied to the underside is a glass fiber layer 7, which comprises an E glass fiber. The density of the glass fiber layer 7 of the underside is 86 g/m$^2$.

The two carbon layers 2, 4 and the two glass fiber layers 6, 8 in this case form the upper outer layer 9 and the two carbon fiber layers 3, 5 and the glass fiber layer 7 form the lower outer layer 10.

According to the first exemplary embodiment of the present invention, all the fiber layers 2, 3, 4, 5, 6, 7, 8, i.e. both the glass fiber layers and the carbon fiber layers, have an epoxy resin as the matrix material. The total thickness of the sandwich structure of the first exemplary embodiment is 9.8 mm.

Figure 2:
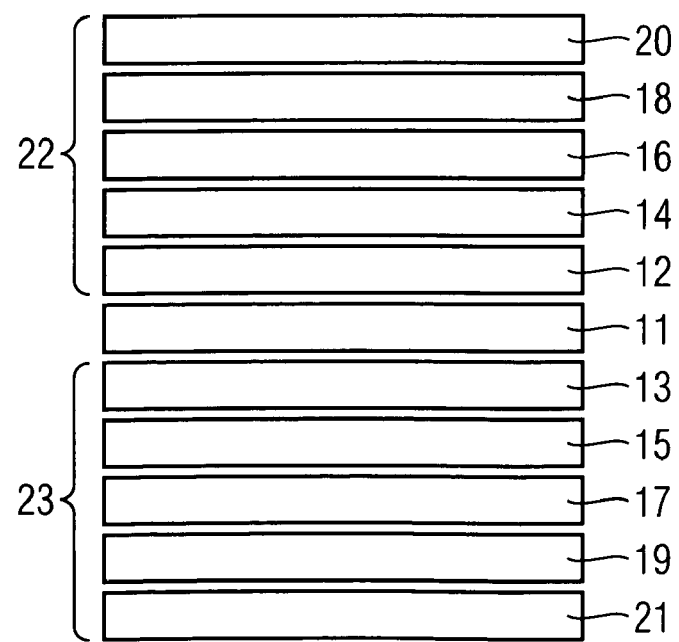
FIG. 2 shows a sandwich structure according to a second exemplary embodiment.

FIG. 2 shows the construction of a sandwich structure according to a further exemplary embodiment of the present invention. Here, the core element is a honeycomb structure 11, containing meta-aramid fiber and having a density of 72 g/m$^2$ and a thickness of 9 mm.

Applied to each side of this honeycomb structure is a carbon fiber layer 12, 13 with a density of 125 g/m$^2$. The fibers in this layer are fibers of the IMS type (intermediate modulus strength) with 24 000 (24K) filaments per thread. The carbon fiber layers according to this exemplary embodiment are woven carbon fiber fabrics, the fibers respectively being laid parallel to one another. The tape orientation of the carbon fibers may be arranged along the loading, for example in the longitudinal direction of an aircraft, in the first layer 12, 13.

On both sides of the sandwich structure, two further directly following carbon fiber layers 14 and 15 are attached. The density of these carbon fiber layers is 123 g/m$^2$, including the resin. Here, too, IMS-24 K carbon fibers are once again used. The laid carbon fiber fabric may be at an angle of 45° to the laid fabric of the first layers 12, 13.

Two further layers 16, 17 are in turn applied to the outside of these layers. These third layers are identical to the second layers with respect to the construction. Only the direction of the carbon fibers within the laid fabric differs from the second layers 14, 15. The carbon fibers of the layers 16, 17 are arranged at an angle of 45° with respect to the first layers 12, 13 and at an angle of 90° with respect to the second layers 14, 15.

Finally, a further layer with carbon fibers is applied to the outside of each layer of the sandwich structure. Here, too, IMS-24 K carbon fibers are once again used, the carbon fiber layer having a density of 154 g/m$^2$, including the resin. The laid carbon fiber fabric is arranged in such a way that the carbon fibers of the fourth layer 18, 19 have an angle of 90° with respect to the first layer 12, 13 and an angle of 45° with respect to the third adjacent layer 16, 17.

Subsequently, a layer 20, 21 comprising glass fiber is applied to each outer side of the sandwich structure. This glass fiber layer comprises a F glass and serves as corrosion and impact protection.

The arrangement of the carbon fiber layers within the sandwich structure can be variably organized. The sequence of the orientation of the laid fabrics can be changed. For example, it is conceivable for the first layer to have a relative orientation of 0°, the second to have a relative orientation with respect to the first layer of −45°, the third layer a relative orientation with respect to the first layer of 90° and the fourth layer a relative orientation with respect to the first layer of 45°. However, any other conceivable construction with respect to the layer sequences and the orientation of the fibers within the layer is also possible.

The carbon layers 12, 14, 16, 18 and the glass fiber layer 20 in this case form the upper outer layer 22 and the carbon fiber layers 13, 15, 17, 19 and the glass fiber layer 21 form the lower outer layer 23.

According to a third exemplary embodiment of the present invention, it is possible in a way corresponding to the first exemplary embodiment for a honeycomb structure which comprises a mixture of para-aramid fibers and meta-aramid fibers to be used as the core element 1. Such honeycomb structures are commercially available for example as N6360-123. With a thickness of 8.8 mm, such a honeycomb structure according to a second exemplary embodiment has a density of 1082 g/m$^2$. Such a honeycomb structure consequently offers a further weight advantage over the honeycomb structure used according to the first exemplary embodiment. This weight advantage, however, does not lead to disadvantageous performance data for the honeycomb structure.

According to another exemplary embodiment of the present invention, further carbon fiber layers may be applied, for example at an angle of 45° and/or 135° (corresponding to −45°) with respect to the direction of the fibers of the first layer 2, 3. However, it is also possible to apply just one carbon fiber layer to the honeycomb structure.

Although the present invention has been described here on the basis of preferred exemplary embodiments, it is not restricted to these but can be modified in various ways.

For example, further carbon fiber and/or glass fiber layers may be integrated in the structure. The glass fiber layers may also be formed as laid fabrics.

What is claimed is:

1. A sandwich structure for an aircraft, comprising:
   an upper outer layer;
   a lower outer layer; and
   a core element formed as a honeycomb structure arranged between the outer layers;
   the outer layers each comprising at least one carbon fiber layer facing the core element and at least one glass fiber layer facing away from the core element,
   at least four carbon fiber layers being applied on each side of the honeycomb structure,
   the at least four carbon fiber layers being oriented in direction of principal force transmission in the aircraft for specifically transmitting loads, and
   the fibers of the at least four carbon fiber layers being arranged in longitudinal direction of the aircraft, at an angle of 45° relatively to the longitudinal direction, at an angle of 135° relatively to the longitudinal direction and at an angle of 90° relatively to the longitudinal direction.

2. The sandwich structure according to claim 1, wherein the honeycomb structure of the core element comprises an aramid fiber.

3. The sandwich structure according to claim 1, wherein the honeycomb structure of the core element is composed of an aramid fiber paper.

4. The sandwich structure according to claim 2, wherein the aramid fiber contains a para-aramid fiber and/or a meta-aramid fiber.

5. The sandwich structure according to claim 1, wherein the honeycomb structure of the core element has a hexagonal structure.

6. The sandwich structure according to claim 1, wherein the fibers of the carbon fiber layers are laid in different directions.

7. The sandwich structure according to claim 6, wherein the fibers of the carbon fiber layers are laid at an angle of 40° to 50° in relation to one another.

8. The sandwich structure according to claim 1, wherein the fibers of the glass fiber layer are a laid fabric or a woven fabric.

9. The sandwich structure according to claim 1, wherein the sandwich structure has a total thickness of 5 to 30 mm.

10. The sandwich structure according to claim 9, wherein the sandwich structure has a total thickness of 7 to 15 mm.

11. The sandwich structure according to claim 10, wherein the sandwich structure has a total thickness of 10 mm.

12. The sandwich structure according to claim 1, wherein the fibers of the carbon fiber layers are laid at an angle of 80° to 100° in relation to one another.

13. The sandwich structure according to claim 1, adapted for use in the aerospace sector.

\* \* \* \* \*